UNITED STATES PATENT OFFICE.

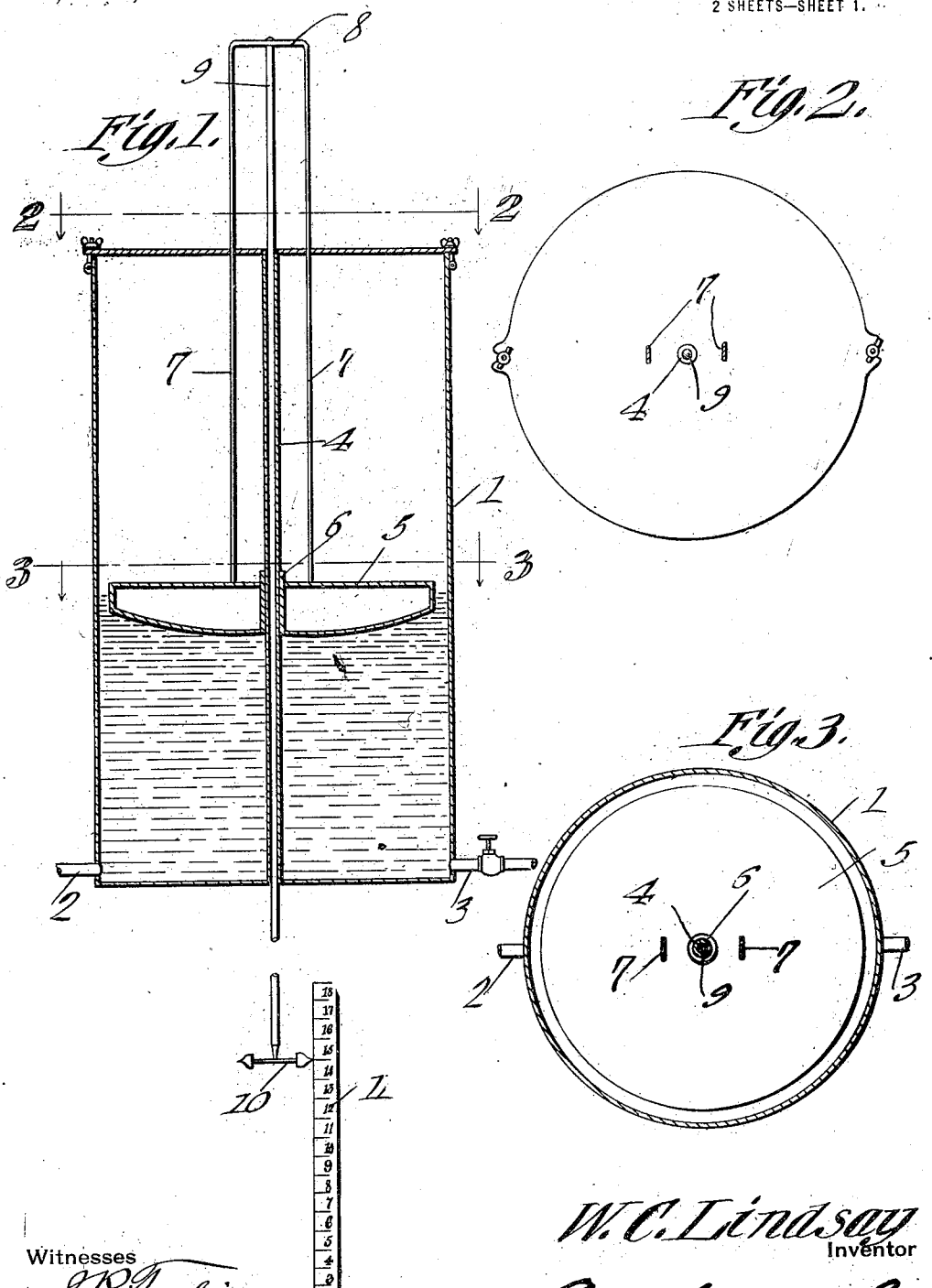

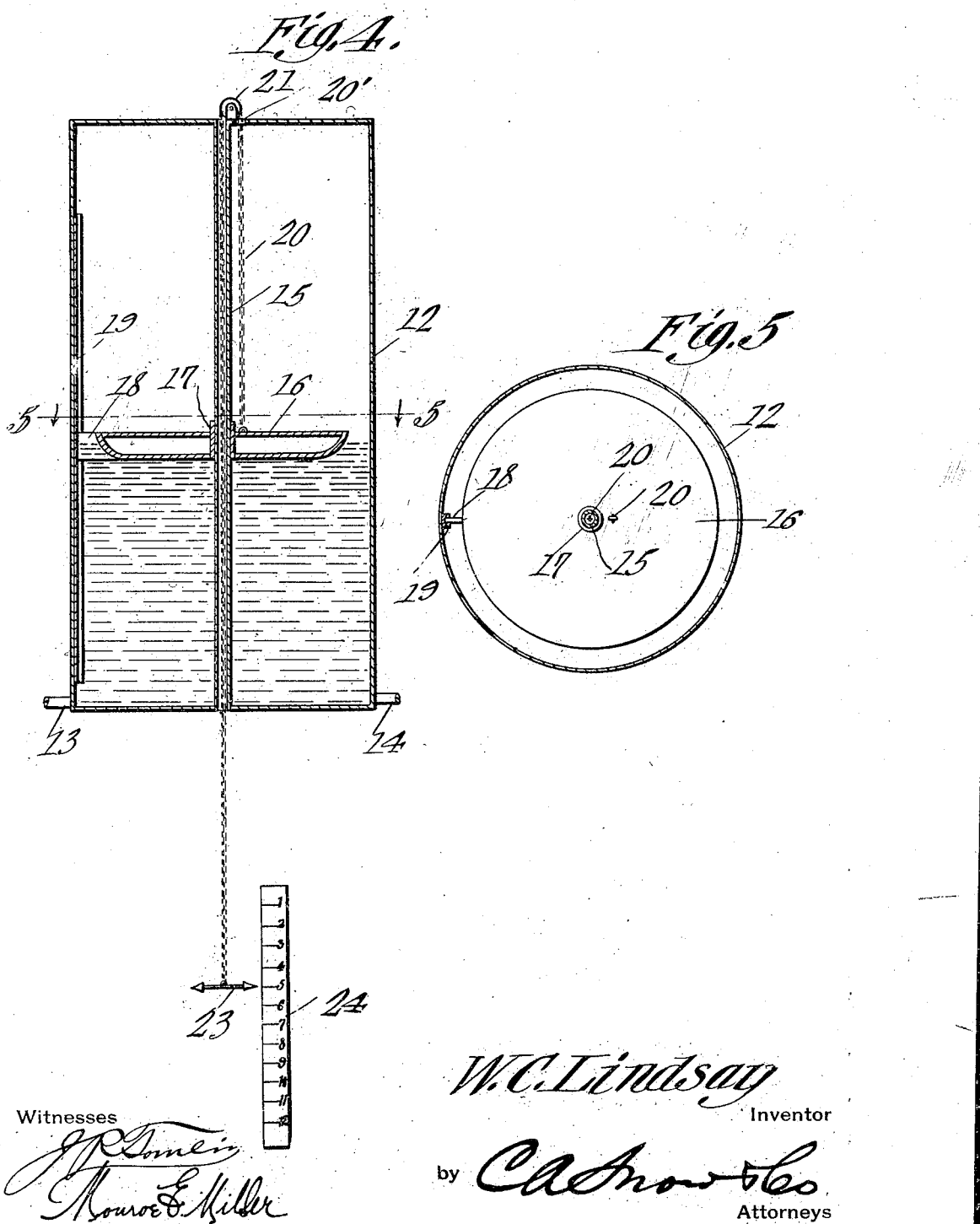

WILLIAM C. LINDSAY, OF NEWPORT, VERMONT.

MEASURING DEVICE FOR TANKS.

1,170,290.  Specification of Letters Patent.  Patented Feb. 1, 1916.

Application filed June 11, 1915. Serial No. 33,569.

*To all whom it may concern:*

Be it known that I, WILLIAM C. LINDSAY, a citizen of the United States, residing at Newport, in the county of Orleans and State of Vermont, have invented a new and useful Measuring Device for Tanks, of which the following is a specification.

The present invention appertains to measuring devices for tanks, and aims to provide a novel and improved means for indicating the amount of gasolene, kerosene or other liquid within a tank, reservoir or other container, whereby it is possible at all times for the attendant to observe in a convenient manner, the amount of liquid within or the amount discharged from the tank, and whereby a predetermined quantity of liquid may be run into the tank, as when purchasing or filling the tank by a given unit of measure.

It is also within the scope of the invention to provide an appliance of the nature indicated which is extremely simple and inexpensive in construction, which may be readily applied to various tanks, reservoirs, and other containers, and which is also simple, practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a longitudinal vertical section taken through a tank embodying the improved measuring device, portions being broken away. Figs. 2 and 3 are horizontal or cross sections taken on the lines 2—2 and 3—3, respectively, of Fig. 1. Fig. 4 is a vertical section illustrating a modification. Fig. 5 is a horizontal section taken on the line 5—5 of Fig. 4.

In carrying out the invention, reference being had to Figs. 1, 2 and 3, wherein a tank, reservoir or container 1 is illustrated as having inlet and outlet pipes 2 and 3 connected to its lower end, an upright or vertical tubular member or pipe 4 is disposed centrally within the tank 1 and has its ends engaged through the upper and lower ends of the tank. A float 5, preferably in the form of a hollow sheet metal member, is disposed for vertical movement within the tank 1, and is slidably carried by the tubular member 4, the float 5 having a sleeve 6 engaged therethrough which is slidable upon the tubular member 4. This will guide the float for true vertical movement. The bottom of the float is preferably concaved to prevent the float hindering the flow of liquid into or out of the tank when the float is lowered adjacent the bottom or lower end of the tank.

A doubled bar 8 having its ends disposed downwardly, has its limbs 7 passing slidably through the upper end of the tank 1 at opposite sides of the tubular member 4, and the lower ends of the limbs 7 are soldered or otherwise secured to the top of the float 5. The bar 8 also assists in guiding the float 5 for vertical movement, and prevents the float 5 from rotating within the tank. A rod 9 is slidable through the tubular member 4 and projects above and below the tank, the upper end of the rod 9 being secured in any suitable manner to the yoke portion or bend of the bar 8. A suitable pointer 10 is carried by the lower end of the rod 9 and operates with a graduated scale 11, this scale 11 being graduated to properly indicate the quantity of liquid within the tank according to the position of the float 5. The rod 9 and bar 8 thus serve to connect the pointer or indicator 10 and the float 5, said connection extending from the float slidably or movably through the upper end or top of the tank and then extending downwardly through the tubular member 4, which provides a compact and desirable arrangement.

When the float 5 rises and falls due to the change of level of contents of the tank, the rod 9 will be moved upwardly and downwardly with the float, and this will cause the pointer to indicate in a convenient and accurate manner, the quantity of liquid within the tank by the coöperation of the pointer 10 with the graduated scale 11. The graduated scale 11 and pointer 10 are located below the tank, which is a very desirable and salient feature. Thus, if the tank is used as a gasolene or kerosene supply tank upon a motor vehicle, the scale and pointer may be located below the tank or body of the vehicle, to be readily observed at any time, such as when the tank is being filled, or when it is desired to know how much fuel is in the tank.

The use of the measuring device is not limited to motor vehicle supply tanks, but it is apparent that the invention may be employed in various capacities, and that appropriate changes in details can be made, within the scope of what is claimed hereinafter, without departing from the spirit of the invention.

A variation of the invention is illustrated in Figs. 4 and 5. In Figs. 4 and 5, a tank, reservoir or container 12 is illustrated, the same having the lower inlet and outlet pipes 13 and 14. A vertical tubular member or pipe 15 is disposed within the tank 12 and has its ends engaged through the upper and lower ends of the tank 12, and a float 16 is disposed within the tank 12 for vertical movement. This float 16 has a sleeve 17 engaged therethrough which is slidable upon the tubular member 15 to guide the float for vertical movement, and the float 16 has a fin 18 projecting radially from its periphery, and having its free end received by an upright guide 19 carried by one side of the tank 12. The fin 18 in working within the guide 19 prevents the float 16 from rotating. A chain or other flexible element 20 has one end attached to the float 16 and passes upwardly through an aperture 20' provided in the upper end or top of the tank. The chain or flexible element 20 passes over a pulley wheel or guide 21 mounted for rotation upon the upper end or top of the tank adjacent the aperture 20', or between the aperture 20' and the upper end of the tubular member 15. From the pulley wheel 21, the chain 20 passes downwardly through the tubular member 15, and a pointer 23 is carried by the lower or free end of the chain 20 below the bottom or lower end of the tank 12. The pointer 23 coöperates with a suitable graduated scale 24.

The advantages and attributes of the invention are numerous, and need not be itemized at length, since they will suggest themselves to those skilled and versed in the art, it also being noted that the invention is susceptible to various alterations and changes in construction, when adapting it to various environments.

The device may be employed advantageously in garages, and the like, for enabling a predetermined quantity of liquid fuel, or other liquid, to be dispensed, as will be apparent.

Instead of having the scale located immediately below the tank, it may be located at any other suitable position, and the pointer or indicator element may be operably connected to the float in various manners, within the scope of what is claimed, without departing from the spirit of the invention.

Having thus described the invention, what is claimed as new is:

1. In an appliance of the character described, a tank, a tubular member projecting upwardly from the bottom thereof, a float slidable upon said tubular member within the tank, and a member extending through and movable vertically within said tubular member for operating an indicating device from its lower end and having at its upper portion means operatively connecting with the float.

2. In an appliance of the character described, a tank, a tubular member projecting upwardly from the bottom thereof, a float slidable upon said tubular member within the tank, a rod slidable through said tubular member for operating an indicating device from its lower end, and a bar attached to the float and to the upper end of said rod.

In testimony that I claim the foregoing as my own, I have hereto affixed my signature in the presence of two witnesses.

WILLIAM C. LINDSAY.

Witnesses:
F. S. TIELKHAM,
TOM C. CAMP.